United States Patent [19]

Lahoda et al.

[11] Patent Number: 5,077,020
[45] Date of Patent: Dec. 31, 1991

[54] METAL RECOVERY PROCESS USING WATERGLASS

[75] Inventors: Edward J. Lahoda, Edgewood Borough; Allegheny, Pa.; Beryl H. Parks, Lexington, S.C.

[73] Assignee: Westinghouse Electric Corp., Pittsburgh, Pa.

[21] Appl. No.: 652,475

[22] Filed: Feb. 8, 1991

Related U.S. Application Data

[63] Continuation of Ser. No. 453,744, Dec. 20, 1989, abandoned.

[51] Int. Cl.$^5$ .............................................. C01G 43/00
[52] U.S. Cl. ........................................ 423/18; 423/11; 423/12; 423/1; 423/326; 252/631
[58] Field of Search .................. 423/1, 18, 11, 12, 118, 423/326; 252/631

[56] References Cited

U.S. PATENT DOCUMENTS

| | | | |
|---|---|---|---|
| 2,812,232 | 11/1957 | Delaplaine | 423/10 |
| 2,839,358 | 6/1958 | Price et al. | 423/16 |
| 2,861,866 | 11/1958 | Seaborg et al. | 423/15 |
| 2,863,716 | 12/1958 | Thunaes et al. | 423/12 |
| 2,866,680 | 12/1958 | Long | 423/7 |
| 2,878,100 | 3/1959 | Googin | 423/16 |
| 2,887,355 | 5/1959 | Katzin et al. | 423/6 |
| 3,105,734 | 10/1963 | Hart | 423/17 |
| 3,219,408 | 11/1965 | Bradley et al. | 423/4 |
| 3,326,811 | 6/1967 | Healy | 252/631 |
| 3,557,013 | 1/1971 | Detilleux et al. | 252/628 |
| 3,753,920 | 8/1973 | Anastasia et al. | 252/627 |
| 4,177,241 | 12/1979 | Divins et al. | 423/20 |
| 4,226,837 | 10/1980 | Achenbach et al. | 423/118 |
| 4,253,985 | 3/1981 | Filter et al. | 252/628 |
| 4,310,496 | 1/1982 | Achenbach et al. | 423/118 |
| 4,338,286 | 7/1982 | Nakai et al. | 423/12 |
| 4,349,513 | 9/1982 | Ishiwata et al. | 423/12 |
| 4,476,099 | 10/1984 | Camp et al. | 423/10 |
| 4,476,101 | 10/1984 | Dugua | 423/253 |
| 4,501,691 | 2/1985 | Tanaka et al. | 252/631 |
| 4,576,802 | 3/1986 | Floreancig | 423/20 |
| 4,656,011 | 4/1987 | Garraway et al. | 423/10 |
| 4,656,015 | 4/1987 | Divins et al. | 423/261 |
| 4,668,482 | 5/1987 | Hermens et al. | 423/15 |
| 4,775,495 | 10/1988 | Izumida et al. | 252/628 |
| 4,808,390 | 2/1989 | Tanaka et al. | 423/261 |

FOREIGN PATENT DOCUMENTS

| | | |
|---|---|---|
| 0071679 | 2/1983 | European Pat. Off. . |
| 0027800 | 3/1978 | Japan . |
| 0092123 | 7/1981 | Japan . |

*Primary Examiner*—Brooks H. Hunt
*Assistant Examiner*—Ngoclan T. Mai
*Attorney, Agent, or Firm*—J. C. Valentine

[57] ABSTRACT

Sodium silicate (waterglass) is added to a waste process stream containing metal to form a waterglass sludge containing the metal contaminants. The waterglass sludge matrixed with the metal is removed from the stream. Thereafter, a caustic is added to the separated waterglass sludge which dissolves the sodium silicate, leaving a metal solid in suspension. The sodium silicate solution is filtered off and recycled for use in the waterglass precipitation process. The metal solid remains and concentrated acid is added to form a metallic acid solution which is substantially free of silicates. This solution may then be treated by solvent extraction or other means to recover the metal. The process provides substantial metal recovery from the process waste stream and eliminates the need for burial of the waste, thereby eliminating burial costs.

33 Claims, 2 Drawing Sheets

METAL RECOVERY PROCESS USING WATERGLASS

This is a continuation of application Ser. No. 453,744, filed Dec. 20, 1989, now abandoned.

BACKGROUND OF THE INVENTION

1. Field of the Invention

The present invention relates to a waterglass precipitate recovery process for metals. More specifically, the process introduces waterglass to a process waste stream, the waterglass forms a matrix sludge with the metals in the stream, the waterglass matrix sludge formed therefrom is separated from the process stream and is then dissolved, freeing the metals dissolved in the waterglass matrix sludge for recovery. The waterglass may then be recycled for reuse and the metal may be further processed.

2. The Prior Art

Waterglass processes have been used to remove the final traces of uranium from waste streams produced by ammonium diuranate (ADU) and direct conversion (IDR) processes.

U.S. Pat. No. 4,349,513 discloses a process for recovering uranium in a liquid which adds waterglass to the liquid which forms a precipitate which captures the uranium and treating the precipitate with acid. The leached uranium is recovered as an acid solution. The precipitate is regenerated to waterglass by treatment with an alkali metal hydroxide solution. (See FIG. 1(A).)

A currently used uranium recovery waterglass process based on U.S. Pat. No. 4,349,513 adds a 6 w/o solution of sodium silicate (waterglass) to the process waste which is usually about 6 w/o ammonia, about 1 to 3 w/o fluorine, and about 15 ppm uranium in water. As used in this disclosure, the expression 'w/o' is employed to mean 'weight percent'. The waterglass precipitates, and forms a silicate fluoride matrix sludge which captures the uranium. The silicate fluoride sludge is filtered out of the process stream and sent to a holding tank.

Nitric acid is added intervally to reach a pH of between about 2 and 3 to solubilize the uranium as a weak solution of uranyl nitrate The sludge is then filtered off, solidified and disposed of in 55 gallon drums. The dilute uranyl nitrate solution is sent to solvent extraction where the uranium is recovered and purified. The uranium free nitrate solution is then boiled to recover nitric acid and the sludge is solidified and disposed by, for example, burial. The sludge in the uranyl nitrate solution is mainly silica which is dissolved during the nitric acid leach of the water glass sludge. (See FIG. 1(B).)

There are several disadvantages to the current waterglass processes. A large amount of the metal and/or uranium that is held in the waterglass sludge is lost with the silica since it is unfeasible to perform a good wash of the silica cake. The silica cake is difficult to filter due to the very fine particle size ($<5$ $\mu$m) of the cake. Secondly, as nitric acid is added to the waterglass sludge, localized areas of pH of less than 2 are formed. In these localized areas, the free fluoride in the cake then combines with the nitric acid to form hydrofluoric acid which in turn attacks and dissolves some of the silica. The dissolved silica in the metal and/or uranyl nitrate solution is sent back to the solvent extraction area which causes plugging by solids during the solvent extraction. Moreover, the sludge carries fluoride ion to the nitric acid evaporator which makes the resulting process stream highly corrosive As a result, the acid recovery apparatus must be frequently replaced These prior art processes provide low concentrations of uranium in the waterglass leach liquid which results in very large volumes of uranyl nitrate which need to be processed during solvent extraction. Finally, the leached silica sludge currently produced by the modified process cannot be re-dissolved in concentrated caustic due to the non-reactive nature of the precipitate. Therefore, the silica sludge must be disposed of by burial.

There is a need, therefore, for an economical, simple waterglass precipitate recovery process which produces a higher concentration of fluoride-free metals in the metal nitrate stream, and would eliminate the need for burial of the processed waste.

BRIEF SUMMARY OF THE INVENTION

The present invention is a waterglass recovery process that is simpler, more economical, and more ecologically sound than the processes of the prior art. Specifically, the process introduces waterglass to a process waste stream containing metals, which forms a matrix about the metal in the stream and precipitates. The precipitate is then removed from the stream. Caustic is added to the precipitate at an elevated temperature which dissolves the waterglass matrix or sludge, freeing the metal and/or uranium in the waterglass sludge for recovery by filtration as a metal oxide or hydroxide, an ammonium salt or a sodium salt; for example, ammonium diuranate, sodium diuranate, or uranium oxide or hydroxide. The resulting metallic solids are then dissolved while in the filter cake using an acid to produce an acid solution of the metallic salt. This metallic solution may then be treated further in the solvent extraction area. The sodium silicate solution may then be recycled to a feed tank after adjustment of the concentration for reuse in the process.

It is an object of the present invention to provide a simplified waterglass recovery process for metals.

It is another object of the present invention to provide a solution of metallic nitrate that is substantially silica and fluoride-free.

It is a further object of the invention to use caustic to dissolve the waterglass in the process waste stream and separate it from a matrixed metal before dissolving the metal in acid.

It is yet another object of the prevent invention to provide a waterglass recovery process suitable for the recovery of uranium These and other objects of the present invention will be more fully understood from the following description of the invention.

DETAILED DESCRIPTION OF THE PREFERRED EMBODIMENTS

The process of the present invention can be used with any process waste stream which contains metals. For convenience of description, a waste process stream containing uranium will be used as an example. However, the invention is not limited to the recovery of uranium.

The process is suitable for use with either the ADU or IDR processes, for example. Both of these processes use either $UF_6$ or $UO_2(NO_3)_2$ as feeds. The ADU process adds water to the $UF_6$ and forms $UO_2F_2$. The uranyl fluoride or nitrate solutions are then contacted with ammonium hydroxide to form ammonium diuranate. The ammonium diuranate is then filtered from the solution and processed in a kiln to $UO_2$. The filtrate contains both dissolved and particulate ADU and $UO_2F_2$.

The IDR process injects the $UF_6$ and/or the $UO_2(NO_3)_2$ into a kiln where it is reduced directly to $UO_2$. The off-gasses from this process are then scrubbed, which produces the uranium contaminated solution.

Figure 1A:
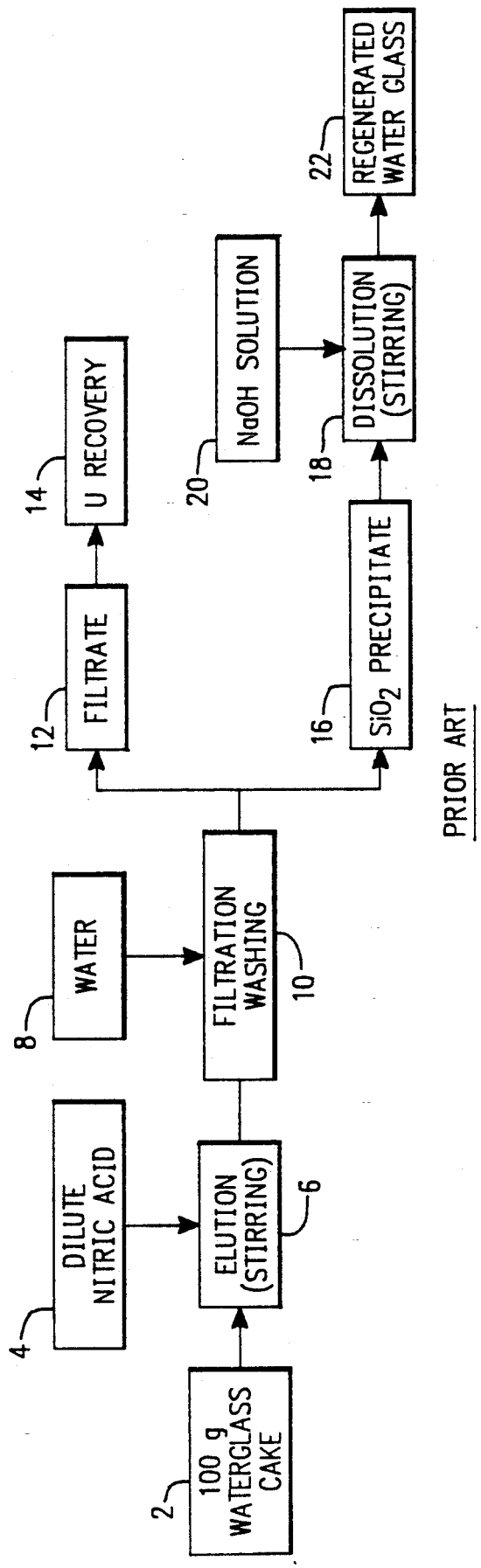
FIG. 1(A) illustrates a flow chart of a prior art process disclosed in U.S. Pat. No. 4,349,513.

FIGS. 1(A) and (B) and 2 illustrate a comparison of the prior art and a presently preferred embodiment of the present invention FIG. 1(A) shows the prior art process disclosed in U.S. Pat. No. 4,349,513. The waterglass cake or slurry 2 is treated with dilute nitric acid 4 by stirring 6 to form uranyl nitrate. After washing with water 8 and filtration 10, the uranium containing filtrate 12 is then processed further to recover the uranium 4. The $SiO_2$ precipitate 16 is then dissolved 18 in a sodium hydroxide solution 20 and then regenerated into waterglass 22.

Figure 1B:
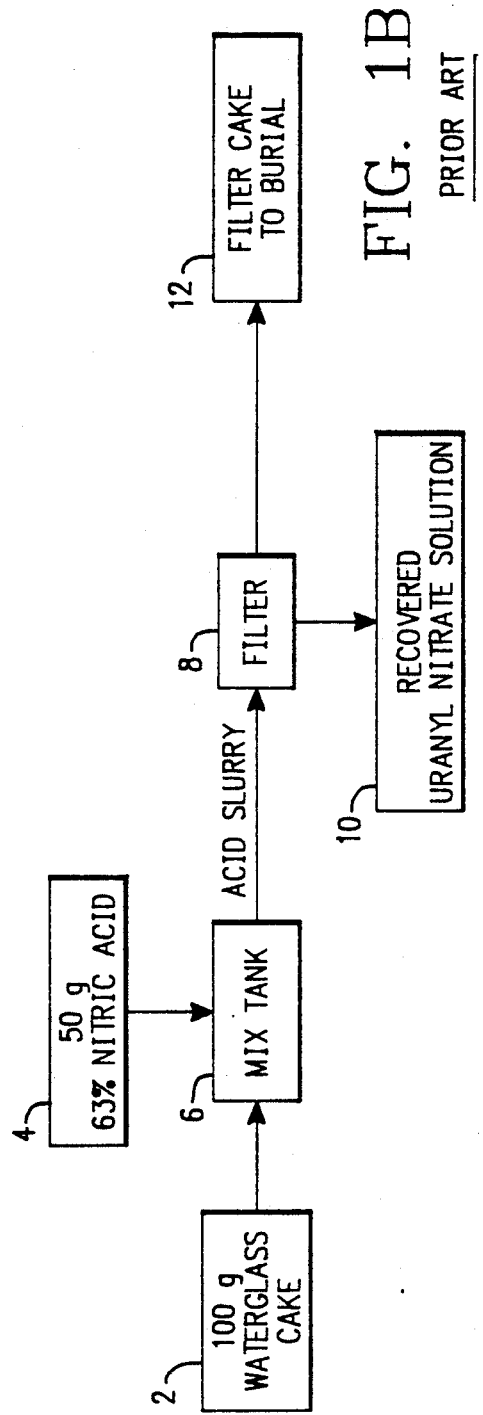
FIG. 1(B) illustrates a flow chart of a currently used prior art process.

In the prior art process illustrated in FIG. 1(b), the waterglass cake or slurry 2 is treated with nitric acid 4 to form uranyl nitrate in a mix tank 6. The nitric acid addition also converts the $NH_4F$ carried over with the cake into HF and $NH_4NO_3$. The HF then attacks the $SiO_2$ and dissolves some of the silica into the solution. The slurry is then filtered 8 to recover a large portion of the uranyl nitrate solution 10. Some attempt may be made to wash the cake. However, due to the extremely fine particle size, this washing is not very effective. The cake is then solidified with concrete and buried as a nuclear waste 12. About 12% of the inlet uranium is lost. Since this uranium is enriched and worth about $1000 per kilogram, this represents a significant loss. In addition, the burial cost (at about $40/ft$^3$) is also significant. Attempts to dissolve the silica in concentrated sodium hydroxide after filtering have not been successful.

Figure 2:
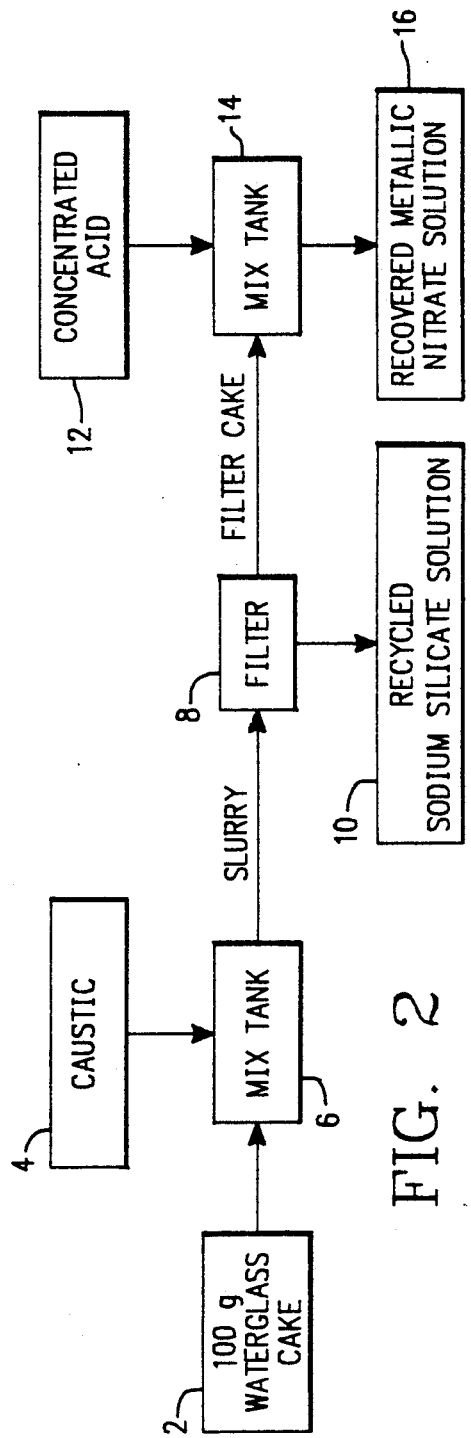
FIG. 2 illustrates a flow chart of a presently preferred embodiment of the present invention.

In the presently preferred process of the present invention as illustrated in FIG. 2, the waterglass cake 2 is first contacted with concentrated caustic 4 in a mix tank 6. Any caustic may be suitable, such as sodium hydroxide or potassium hydroxide, for example. The caustic 4 attacks the waterglass cake or silica matrix 2 and dissolves it. The silica matrix is very reactive in the waterglass precipitate stage. The metal which is contained in the waterglass cake either remains as ADU in the example of uranium or precipitates as the caustic salt of the metal, such as sodium diuranate, or uranium hydroxide. The metallic solids are then filtered out of the dissolved waterglass-based solution 8, and the dissolved waterglass solution may then be recycled for use in this process 10. Usually, the waterglass solution needs to be adjusted to a concentration of about 2 to 8 w/o $SiO_2$. The metallic solids on the filter are then washed with a concentrated acid 12 such as nitric acid in a mix tank 14 and processed further to recover the metal 16. The concentration of the metallic acid salt is about 20 times more concentrated than in the prior art processes of FIGS. 1(A) and 1(B).

With regard to a uranium recovery, after the ADU or IDR processes, a process waste stream is produced. The processed waste generally has about 4 to 8 w/o ammonia, about 1 to 3 w/o fluoride, and about 5 to 100 ppm uranium and up to 8 w/o nitrate in water. Sodium silicate or waterglass is added to the process waste stream at a concentration preferably of about 2 to 8% w/o $SiO_2$ at the rate of about 1 to 10% of the waste stream. The water-glass precipitates matrixing the metal in the process waste stream is then removed from the stream and collected as about a 15 w/o $SiO_2$ solid. About 25 to 50 w/o caustic, such as sodium hydroxide, is then added to the waterglass precipitate at an elevated temperature, preferably about 40° to 70° C. and more preferably about 60° C. The caustic such as sodium hydroxide is preferably present in a ratio of about 3 moles Na per mole of $SiO_2$. Other strong caustics such as potassium hydroxide may be used.

After addition of the caustic, the waterglass sludge dissolves, leaving the metal as a solid in suspension or a sludge. The sodium silicate solution is separated from the metal solids on a filter, in a settling tank or by centrifugation.

The sodium silicate solution may then be recycled by adjusting the concentration of the sodium silicate with concentrated (about 29 w/o $SiO_2$) waterglass and sent to a feed tank for reuse in the waterglass process. Specifically, the concentration of the recycled sodium silicate solution should be about 2 to 8% $SiO_2$.

The resultant metallic solid which is in the form of an ammonium metal or a metal oxide or hydroxide such as ammonium diuranate, sodium diuranate or uranium dioxide or hydroxide, respectively is dissolved in the filter cake using about 20 to 68 w/o acid and more preferably about 40 w/o acid. Any concentrated acid may be used if desired; however, nitric acid is preferred. The resulting nitrate solution is very concentrated in metal and is substantially free of silicates. This solution is then further treated to recover the metal. In the example of uranium recovery, a solvent extraction technique well known to those skilled in the art may be used to recover the uranium.

The volume of the metallic nitrate solution is significantly less than the prior art and results in almost complete recovery of the metal from the waterglass precipitate. Because the waterglass can be recycled, there is a reduction in the amount of waterglass required for this process. Fluoride levels are also reduced, resulting in the reduced corrosion of the equipment. The process of the present invention eliminates the need for burial of the waste, thereby eliminating burial costs.

It will be appreciated that the above-described invention provides a process for metal recovery from waste streams using a waterglass precipitate recovery. ADU or IDR process wastes are particularly suitable for the removal of uranium using this process. Specifically, the addition of a caustic solution to the waterglass matrix precipitate dissolves the waterglass sludge and frees the metal in the waterglass sludge for a more simplified and cost-effective recovery. The waterglass used in this process can be recycled and the metal may be recovered.

Whereas particular embodiments of the invention have been described above for purposes of illustration, it will be appreciated by those skilled in the art that numerous variations of the details may be made without departing from the invention as described in the appended claims.

We claim:

1. A process of recovering metals from a process waste stream containing metals comprising the steps of:

adding waterglass to a process waste stream containing metals and fluorides in an amount of about 1 w/o to 10 w/o waterglass to form a fluoride-containing waterglass metal matrix;

removing the fluoride-containing waterglass metal matrix from said process waste stream;

adding a 25 to 50 w/o caustic to the fluoride-containing waterglass metal matrix to dissolve the waterglass;

separating the dissolved waterglass from the matrix metal; and adding to the separated matrix to dissolve said metal; and separating said dissolved metal from the matrix.

2. The process of claim 1 wherein said caustic is added at a temperature of 40° to 70° C.

3. The process of claim 2 wherein said caustic is sodium hydroxide.

4. The process of claim 3 wherein said sodium hydroxide is added in a ratio of about 2 to 3 moles sodium hydroxide per mole of $SiO_2$ in the waterglass.

5. The process of claim 1 wherein said acid is nitric acid.

6. The process of claim 1 including an additional step of recovering radioactive metals from said matrix.

7. The process of claim 6 wherein uranium is recovered from said matrix.

8. The process of claim 6 wherein said radioactive metals are recovered from a process waste stream comprising about 4 to 8 w/o ammonia, about 1 to 3 w/o fluoride, about 5 to 100 ppm uranium, and up to 8 w/o nitrate in water.

9. The process of claim 1 wherein said waterglass is added as a sodium silicate solution comprising about 2 to 8 w/o $SiO_2$ with the remainder of water.

10. The process of claim 1 wherein said caustic solution is added to the waterglass metal matrix at a temperature of between 40° C. and its boiling point.

11. The process of claim 5 wherein about 20 to 68 w/o nitric aid is added to dissolve the metal.

12. The process of claim 1 wherein the concentration of said waterglass solution is adjusted to about 2 to 8 w/o $SiO_2$ after separating the waterglass solution from the matrix.

13. A method of recovering metals from a waterglass sludge matrix containing metals, comprising the steps of:

adding a 25 to 50 w/o caustic to a fluoride-containing waterglass sludge matrix at an elevated temperature to form a waterglass solution and a metal-containing slurry;

separating the waterglass solution and the metal-containing slurry;

adding acid to said metal-containing slurry to dissolve said metal; and separating said dissolved metal from said slurry.

14. The process of claim 13 wherein said caustic is added to the sludge matrix at a temperature of between 40° C. and its boiling point.

15. The process of claim 14 wherein said caustic is sodium hydroxide.

16. The process of claim 15 wherein said sodium hydroxide is added in a ratio of about 2 to 3 moles sodium hydroxide per mole of $SiO_2$ in the waterglass.

17. The process of claim 13 wherein said caustic is added at a temperature of 40° to 70° C.

18. The process of claim 13 wherein about 20 to 68 w/o nitric acid is added to dissolve the metal.

19. The process of claim 13 including an additional step of recovering radioactive metals from said matrix.

20. The process of claim 19 wherein uranium is recovered from said matrix.

21. The process of claim 13 including an additional step of adjusting the concentration of the waterglass solution to about 2 to 8 w/o $SiO_2$ after separating the waterglass solution from the metal-containing slurry.

22. A process of recovering metals from a liquid stream containing the metals, comprising the steps of:

adding waterglass to a liquid stream containing a metal in an amount in weight ratio of about 1:99 to about 10:90 waterglass to the liquid stream to form a waterglass-metal matrix;

removing the waterglass-metal matrix from said liquid stream;

adding a 25 w/o to 50 w/o caustic to the waterglass-metal matrix to produce a waterglass solution and a metal-containing sludge;

separating the waterglass solution from aid metal-containing sludge; and recycling the waterglass solution to the liquid stream to form additional waterglass-metal matrices.

23. The process of claim 22, wherein sodium hydroxide is the caustic added to the waterglass metal matrix to produce a waterglass solution.

24. The process of claim 23, wherein the sodium hydroxide is added in a ratio of about 2 to 3 moles of sodium hydroxide per mole of silicon dioxide in the waterglass.

25. The process of claim 22, wherein the metal is uranium.

26. The process of claim 25, wherein the liquid stream contains from about 5 to about 100 ppm uranium.

27. The process of claim 25, comprising an additional step of:

adding acid to said separated metal sludge to dissolve said metal.

28. The process of claim 27, wherein nitric acid is added to dissolve uranium.

29. A process of recovering metals from a waterglass sludge matrix containing metals, comprising the steps of:

adding a 25 w/o to 50 w/o caustic to a waterglass sludge matrix to form a waterglass solution and a metal-containing matrix;

separating the waterglass solution and the metal-containing matrix; and recycling the waterglass solution to precipitate additional waterglass sludge matrices containing metals.

30. The process of claim 29, wherein said caustic is sodium hydroxide.

31. The process of claim 30, wherein said sodium hydroxide is added in a ratio of about 2 to 3 moles sodium hydroxide per mole of silicone dioxide in said waterglass.

32. The process of claim 29, wherein the matrix contains uranium.

33. The process of claim 32, comprising an additional step of:

adding an acid to said separated matrix to dissolve said uranium.

* * * * *